Dec. 3, 1929.  E. R. TALBOT  1,737,620
WAFFLE IRON
Original Filed Dec. 22, 1924  2 Sheets-Sheet 1

Inventor
Elmer R. Talbot
By Fred Gerlach
his Atty

Dec. 3, 1929.  E. R. TALBOT  1,737,620
WAFFLE IRON
Original Filed Dec. 22, 1924  2 Sheets-Sheet 2
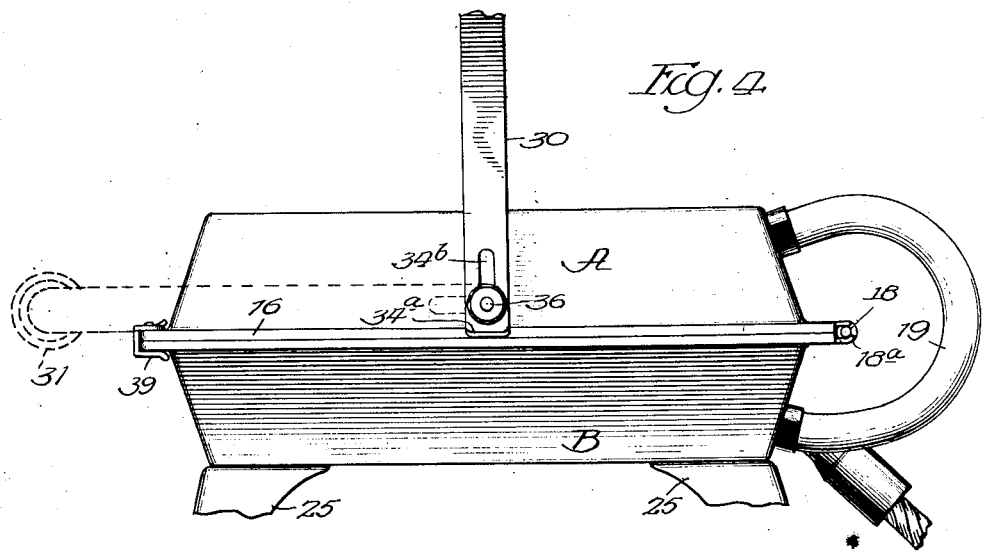
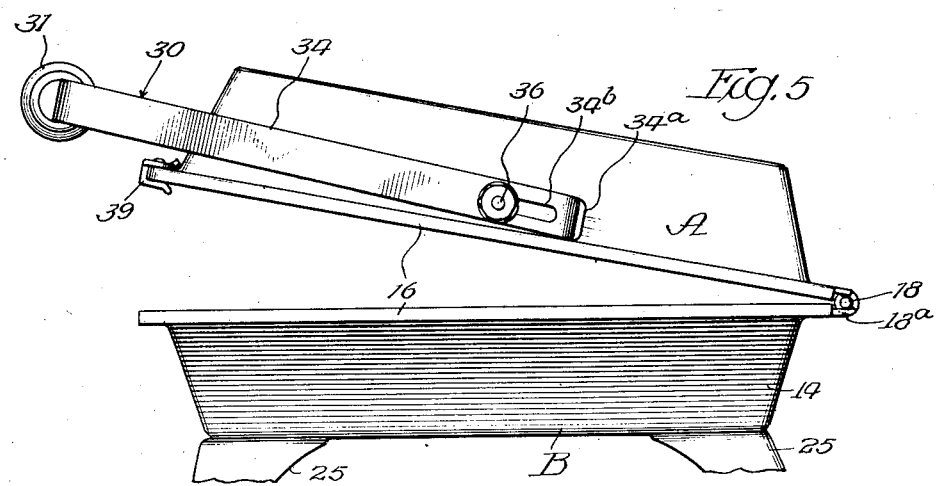
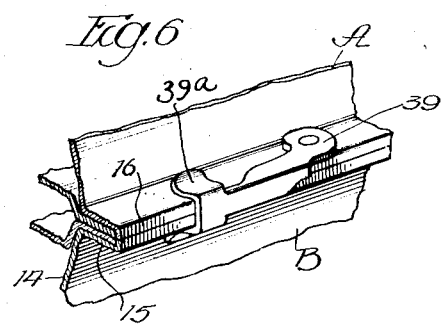
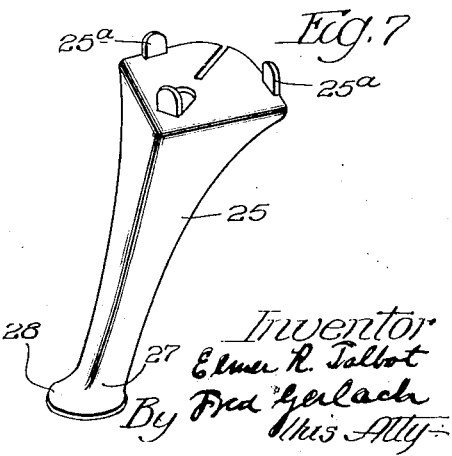
Inventor
Elmer R. Talbot
By Fred Gerlach
His Atty Patented Dec. 3, 1929

1,737,620

UNITED STATES PATENT OFFICE

ELMER R. TALBOT, OF CHICAGO, ILLINOIS

WAFFLE IRON

Application filed December 22, 1924, Serial No. 757,370. Renewed May 24, 1929.

The invention relates to electrically heated waffle irons.

One object of the invention is to provide an improved waffle iron in which the casing members are formed of sheet metal so that the device as a whole will be comparatively light in weight, easily heated and can be produced at a comparatively low cost.

Another object of the invention is to provide an electrically heated waffle iron of such efficient design and construction as to use a minimum amount of heat to cook a given article.

Another object of the invention is to provide an electrically heated cooking utensil in which the heat developed by the heating element is conveyed as directly to the article being cooked as possible.

Another object of the invention is to provide a waffle iron having a grid of equal thickness throughout, and having a heating element exposed directly to the grid, whereby the heat will be conveyed directly and at the same rate to all parts of the surface of the waffle.

Other objects of the invention will appear from the detailed description.

The invention consists in the several novel features hereinafter set forth and more particularly defined by claims at the conclusion hereof.

Figure 1:
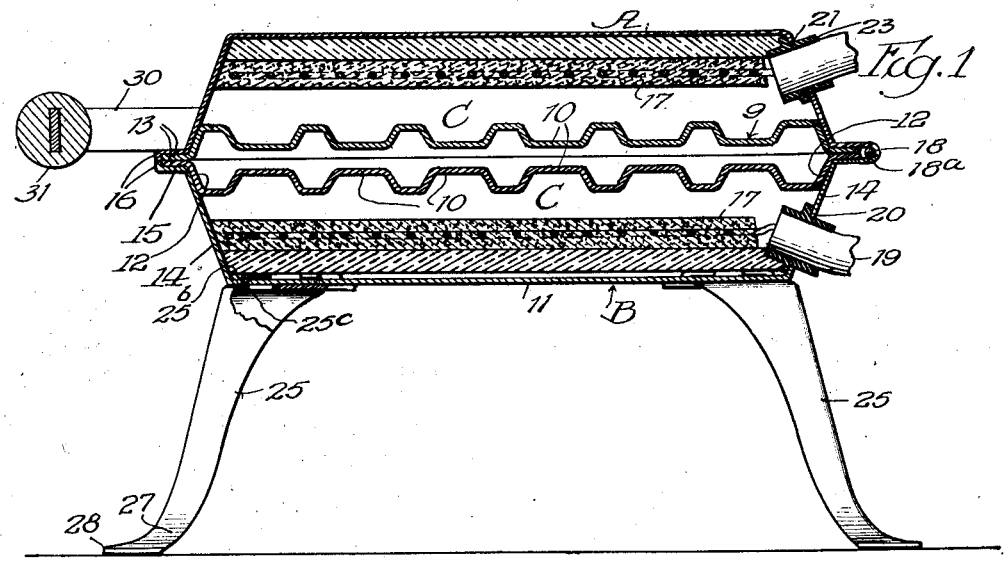
Figure 2:
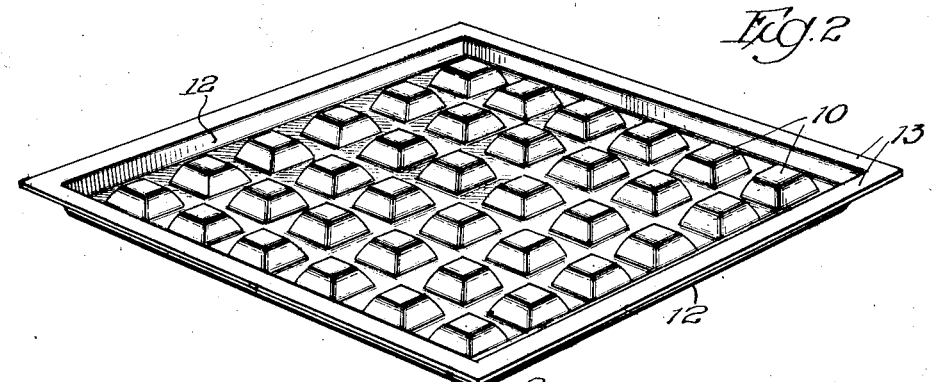
Figure 3:
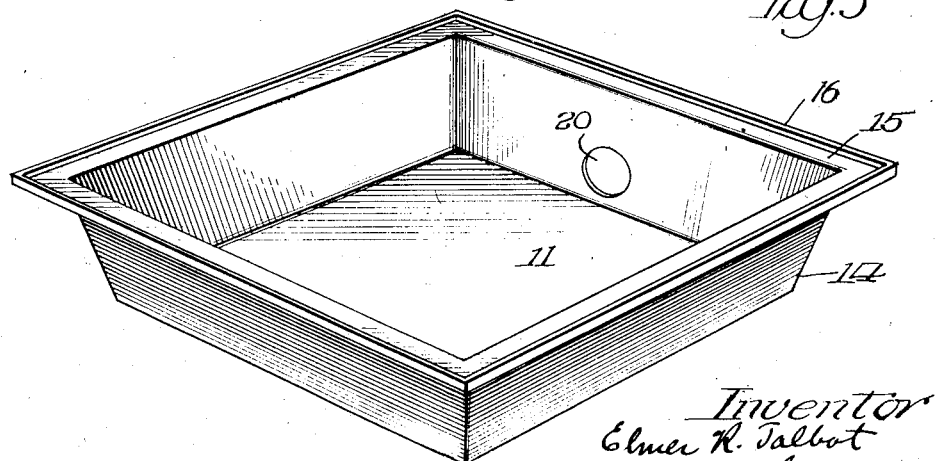

In the drawings: Fig. 1 is a vertical section of the invention. Fig. 2 is a detail perspective of one of the sheet metal plates hereinafter referred to as grids for forming a waffle. Fig. 3 is a detail perspective of the sheet metal wall member in which the grid is secured. Fig. 4 is a side elevation of the invention, parts being broken away, showing the handle or bail in a position whereby the waffle iron may be readily carried. Fig. 5 is a side elevation, similar to Fig. 4, showing how the handle may be used as a lever to raise the upper section or casing of the waffle iron. Fig. 6 is a detail perspective of a portion of the sections, showing the clip which is used to secure the sections together when the iron is to be carried from place to place. Fig. 7 is a perspective of one of the supporting legs.

The invention is exemplified in a waffle iron which comprises an upper section A and a lower section B, the upper section being pivotally secured to the lower section and movable relatively thereto. Each section is provided with a grid 9 and an outer wall member 11, both of which are formed of sheet metal. Grid 9 is provided with a plurality of instruck portions 10 formed in parallel rows and which are adapted to form corresponding cavities or recesses in the finished waffle. It will be understood that the term "waffle" is intended to convey the meaning of a pancake cooked in a container having a raised or depressed design so arranged as to form a corresponding design on the pancake. The edge of grid 9 is provided with an integrally formed flange 12 extending in the same direction and beyond the instruck portions 10 so that when the sections A and B are in the position shown in Fig. 1, the inner surfaces of the portions 10 and grids 9 will be spaced relatively to each other thereby forming a chamber in which waffles may be cooked. The edge of flange 12 is provided with an integral outwardly extending peripheral flange 13. Wall member 11 is held in spaced relation from grid 9 by means of a flange 14 and forms therewith a chamber C in which a suitable electrical resistance element 17 is disposed so as to heat the grid 9. This resistance element is insulated from wall 11 by means of a sheet of asbestos or any other suitable heat insulating material. The edge of flange 14 is provided with an outwardly extending flange 15 and a peripheral flange 16 integrally formed with flange 15 and forming therewith a seat in which the flange 13 of grid 9 is disposed and secured by studs, welding or in any other suitable or like manner.

Sections A and B are pivotally secured together by a hinge 18 which is provided with stops 18ᵃ for limiting the backward movement of section A. The resistance elements in the sections are conventionally connected to each other by means of an electrical conductor 19 which is looped to allow relative movement of the sections and which extends through openings 20 and 21 in the sections respectively. Sleeves 23 formed of any suitable electrical insulating material are secured in said openings to insulate conductor 19 therefrom. Elements 17 are connected in any suitable manner to a line or electrical source of supply.

It will be understood that the element 17 is merely a coating of a suitable heat radiating material on the resistance coil, and that this element is not capable of retaining any considerable quantity of heat, nor is it made of heat resisting material. It accordingly does not require any appreciable quantity of heat to get the element 17 hot, and there is no delay in transmitting the heat from the coil to the grid; in fact, the element 17 being only a thin coating, the heat may be considered to radiate directly from the surface of the coil to the grid. It will also be understood that the element 17 is not an essential part of the invention, and that it might be omitted altogether if desired.

Legs 25, formed of sheet metal, are provided with a plurality of upwardly extending tongues 25ᵃ which extend through slots 25ᵇ in wall member 11 of section B and are bent as at 25ᶜ to rigidly secure the legs thereto. These legs are adapted to support the sections and hold them at a sufficient height above a table or supporting surface so that the heat from the resistance elements will not be transmitted thereto. The lower end of these legs are bent, as at 27, to form surfaces 28 for engaging the table.

A handle or bail 30 comprising a grip 31 made of wood and a pair of arms 34 is disposed adjacent the hinge 18. The inner ends of arms 34 are flared outwardly as at 34ᵃ and are pivotally secured to flange 14 on upper section A by means of screws 36 which extend through slots 34ᵇ in the arms respectively. By means of these slots, the arms may be thrust forwardly, as shown in Fig. 5, and the flared ends of arms 34 which project beyond the screws 36 will abut against the flange 15 so that a lever is formed by which the upper member A may be raised. By pulling the arms outwardly, as shown in dotted lines in Fig. 4, the bail or handle may be raised to a vertical position (shown in Fig. 4) and the waffle iron readily carried to any desired place. When the iron is to be conveyed or carried, the sections A and B will be secured together by means of a clip 39 which is pivotally secured to flange 15 on the upper section A and which is provided with lips 39ᵃ which are adapted to engage and extend around the flanges 15 so as to hold them securely together.

In operation, the clip 39 is released, and the iron is opened on the hinges 18. The electric heating elements 17 being in operation, heat radiates directly to the adjacent surface of the grids 10. Due to the thin construction and small heat capacity of the grids, the heat is transmitted directly to the inner surface. A suitable amount of waffle dough being placed in the lower half of the iron, the iron is closed and secured in closed position by the clip 39, if desired.

It will be noted that the shape and formation of the grids are such that a comparatively large surface area of the waffle is exposed to the grid, and a comparatively large surface area of the grid is also exposed to the heating element. The heating capacity of the grid is very small on account of its thin construction, and the heat is consequently transmitted almost immediately to the surface of the waffle or other article which is being cooked.

It will also be noted that due to the fact that the grid is of equal thickness at all points, the transfer of heat will be simultaneous and at the same rate to all parts of the surface of the waffle. This results in increased efficiency for the reason that the grid reaches a suitable temperature for cooking almost immediately after the heating elements are put in operation, and when the cooking is done, there is a comparatively small amount of wasted heat remaining in the cooking utensil.

It will be seen that I have not only produced a cheap waffle iron, but a more efficient one, both from the standpoint of heat used and even transference of heat to the surface of the article which is to be cooked.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a waffle iron, the combination of a pair of superposed movably connected members provided with waffle forming plates, an outwardly extending flange on the upper member, a bail provided at its ends with slots, means extending through said slots for pivotally securing said bail to the upper member adjacent said flange, and means for electrically heating said members.

2. In a waffle iron, the combination of a pair of superposed movably connected members provided with waffle forming plates, an outwardly extending flange on the upper member, a bail provided at its ends with flared portions and slots, means extending through said slots for pivotally securing said bail to the upper member adjacent said flange, and means for electrically heating said members.

3. In a device of the class described, a pair of superposed sheet metal grids forming a waffle container therebetween, and heating elements comprising a metallic resistance coil mounted outside of said container and adjacent each of said grids and arranged to radiate heat directly from said coil to the outer sides of said grids.

4. In a device of the class described, a pair of sheet metal grids having corresponding depressions stamped therein, said grids and depressions being so constructed and arranged as to form a waffle container between said grids, a sheet metal housing for each of said grids, said housing being attached to said grids around the edges thereof, and covering the outer side of said grids only, heating elements mounted between said housings and said grids, said heating elements being constructed and arranged to radiate heat directly to the outer surface of said grids.

5. In a device of the class described, a waffle container having two waffle-forming metal grids of equal thickness throughout, and an electric heating element on said container arranged to radiate heat directly to the grid of said container.

6. In a device of the class described, a pair of superposed sheet metal grids having registering depressions stamped therein, these depressions cooperating to form a waffle container when said grids are superposed, and a metallic heating element comprising a resistance coil directly exposed to the outer surface of said grid, whereby a substantially even distribution of the heat to the surface of said grid is secured and whereby the heat will be evenly applied to the inner surface of said container.

7. In a waffle iron, a waffle container having waffle-forming walls of substantially equal thickness throughout, an electric heating coil mounted adjacent to the outer side of said walls and adapted to transmit the heat directly from the coil to said walls, said container being formed of sheet metal and having a low heat capacity, whereby it may be quickly heated with a small consumption of current.

8. In a waffle iron, a pair of superposed sheet metal waffle forming plates of substantially uniform thickness throughout, a housing covering the back of each of said plates and forming air spaces between the housings and plates, electric heating coils mounted within said air spaces, said coils being separated from said plates only by air, whereby said coils may radiate heat directly and evenly to the surface of said plates.

9. In a waffle iron, a pair of superposed sheet metal waffle-forming plates of substantially uniform thickness throughout, a housing covering the back of each of said plates and forming air spaces between the housings and plates, electric heating coils mounted within said air spaces, said coils being separated from said plates only by air, whereby said coils may radiate heat directly and evenly and a sheet of heat-resisting material mounted between said heating elements and said housing.

Signed at Chicago, Illinois, this 11th day of December, 1924.

ELMER R. TALBOT.